Patented Oct. 12, 1954

2,691,565

UNITED STATES PATENT OFFICE 2,691,565

TEXTILE DYEING PROCESS, INCLUDING ACID FADING INHIBITOR

Frank Berardinelli, South Orange, and William J. Myles, Summit, N. J., assignors to Celanese Corporation of America, New York, N. Y., a corporation of Delaware No Drawing. Application April 16, 1952, Serial No. 282,702

1 Claim. (Cl. 8—61)

This invention relates to the treatment of organic derivatives of cellulose in order to enhance the fastness of dyes thereon.

In the coloration of textile materials, it is very desirable that the colors produced on the materials be as fast as possible to light, washing, and to other agencies such as acid fumes. Many dyestuffs yield on organic derivative of cellulose materials desirable colors which are fast to washing but these colors often suffer from a lack of fastness to acid fumes. When fabrics to which these dyestuffs have been applied are exposed to acid fumes, such as, for example, the products of combustion of coal, gas, etc., the color undergoes a change in shade. This change is usually referred to as acid fading. The change which occurs may be a dulling of the brightness of the shade in some instances, and in others there may be a definite change in color. This undesirable effect is frequently observed in the case of many anthraquinone dyestuffs which yield valuable blue colors on organic derivative of cellulose materials. When fabrics dyed with these colors are exposed to acid fumes, the colors change from a pure blue shade to one having a reddish cast. On continued exposure to the acid fumes, the blue color may even change to a pink color. Such changes naturally restrict the range of usefulness of these dyestuffs. Accordingly, methods of increasing the resistance of these dyes to acid fading are of great commercial importance.

N,N'-diphenyl ethylene diamine is described as an acid fading inhibitor in U. S. Patent No. 2,416,380, February 25, 1947. However, the use of this compound has the marked defect that on exposure to acid fumes it tends to develop a color of its own, when in or on the cellulose acetate or other organic derivative of cellulose. This defect is quite serious, especially in the case of pastel dyeings where any discoloration of the inhibitor by the gas fumes would effect a marked change in shade. For example, when N,N'-diphenyl ethylene diamine is used as an inhibitor for a pastel blue dyeing, exposure to acid fumes changes the blue dyeing to a green shade.

It is an object of this invention to overcome this acid fading tendency of dyeings on cellulose acetate or other organic derivative of cellulose material by incorporating into the cellulose acetate or other organic derivative of cellulose material an acid fading inhibitor which has a substantive affinity for the cellulose acetate or other organic derivative of cellulose material.

It is a further object to overcome this acid fading tendency by the use of an inhibitor which, when incorporated into the organic derivative of cellulose material, is fast to washing and dry cleaning and does not discolor on exposure to light and acid fumes.

Other objects of this invention will appear from the following detailed description.

We have now found that the acid fading characteristics of dyed cellulose acetate or other organic derivatives of cellulose which have been dyed with dyestuffs which are not fast to the action of acid fumes may be substantially improved if there is incorporated in said cellulose acetate or other organic derivative of cellulose N,N'-di-(2 - chlorophenyl) - ethylene diamine. When N,N' - di - (2-chlorophenyl)-ethylene diamine is used as the inhibitor, in accordance with our invention, outstanding protection against acid fading is obtained, and in contrast to the results with N,N'-diphenyl ethylene diamine, there is no tendency for the inhibitor to discolor on exposure of the cellulose acetate or other organic derivative of cellulose material to acid fumes.

The N,N'-di-(2-chlorophenyl)-ethylene diamine, used as the inhibitor in accordance with our invention, has a substantive affinity for the cellulose or other organic derivative of cellulose material. The protection against acid-fading provided by this inhibitor is fast to dry-cleaning, to wet washing and to sunlight.

The position of the chlorine atoms on the N,N'-di-(chlorophenyl)-ethylene diamine is of great importance. For example, N,N'-di-(3-chlorophenyl)-ethylene diamine gave practically no protection against acid fading, as compared with the superior protection provided by the isomeric N,N'-di-(2-chlorophenyl)-ethylene diamine of our invention.

The N,N'-di-(2-chlorophenyl)-ethylene diamine may be applied to or incorporated in the cellulose acetate or other organic derivative of cellulose in any desired manner. Thus, it may be incorporated into a solution of the cellulose derivative before such solution is cast into a film or extruded as a filament, or it may be applied to dyed cellulose acetate or other organic derivative of cellulose textile material in the form of an aqueous dispersion or as a solution in a solvent such as benzene, toluene or other solvent which does not have an undesirable solvent action on the organic derivative of cellulose material. The N,N'-di-(2-chlorophenyl)-ethylene diamine may also be applied to the dyed organic derivative of cellulose material in the form of a stable aqueous emulsion comprising a solution of said N,N'-di-(2-chlorophenyl)-ethylene diamine in a water-insoluble organic solvent, for example benzene or toluene, which is dispersed in water with the aid of suitable dispersing agents to form the desired emulsion, the droplets of the water-insoluble solvent solutions of this inhibiting agent comprising the disperse phase and the water the continuous phase of the emulsion. It may also be applied together with the dye by a procedure in which both the dye and the inhibitor are applied to the cellulose derivative from the same dyebath. In such a procedure both the dye, which may be an anthraquinone dye such as 1,4 di (methylamino) anthraquinone or 1 hydroxy 4 anilino anthraquinone, and the N,N'-di-(2-chlorophenyl)-ethylene diamine may be colloidally dispersed in water, using the same dispersing agents for both. The N,N'-di-(2-chlorophenyl)-ethylene diamine may be also added to printing pastes or powdered dyes to be used in printing pastes or it may be dispersed uniformly with the lubricants or sizes conventionally used in the treatment of organic derivative of cellulose textile materials.

The proportions of N,N'-di-(2-chlorophenyl)-ethylene diamine preferably range from 0.1 to 5%, more desirably from 0.5 to 2% by weight of the organic derivative of cellulose, though higher or lower amounts may be used.

In order to further illustrate our invention, but without being limited thereto, the following examples are given:

Example I 5 liters of a mixture of 4 parts by volume of turkey red oil, 2 parts by volume of a 10% solution of green soap in water, and 1 part by volume of a 50% solution of potassium pyrophosphate in water, and 20 grams of 1-(2-hydroxyethyl amino)-4 methyl amino anthraquinone, a blue dye, were dissolved in 50 liters of water at 80° C. and the resulting solution was mixed with a solution of 100 grams of N,N'-di-(2-chlorophenyl)-ethylene diamine dissolved in 5 liters of acetone. The whole was then diluted with water to a total volume of 700 liters at 80° C. and this hot diluted mixture was used to dye 10 kilograms of cellulose acetate textile fabric for 1 hour at 80° C. Following the dyeing the fabric was rinsed thoroughly with distilled water. The resulting fabric had greatly improved resistance to acid fading, as shown by absence of appreciable fading or discoloration after 2 fading exposures by A. A. T. C. C. test, tentative test #23–46 described in the 1951 yearbook of the American Association of Textile Chemists and Colorists. The fabric retained its fade-resistance after washing 30 minutes at 40° C. with 0.5% soap solution.

Example II

Example I was repeated with the exception that 200 grams of N,N'-di-(2-chlorophenyl)-ethylene diamine were used instead of 100 grams. The resulting dyed fabric had even greater resistance to acid fading, as shown by no appreciable fading after 3 fading exposures by the A. A. T. C. C. test. The treatment was wash-fast.

Example III

Example I was repeated with the exception that 400 grams of N,N'-di-(2-chlorophenyl)-ethylene diamine were used instead of 100 grams. The dyed fabric had still better resistance to acid fading than the fabric of Example II. The treatment was wash-fast.

Example IV

The procedure of Example I was repeated with the sole exception that N,N'-di-(3-chlorophenyl)-ethylene diamine was substituted for the N,N'-di-(2-chlorophenyl)-ethylene diamine. The dyed fabrics produced in this manner had practically no resistance to acid fading.

Example V

The procedure of Example II was repeated with the sole exception that N,N'-di-(3-chlorophenyl)-ethylene diamine was substituted for the N,N'-di-(2-chlorophenyl)-ethylene diamine. The dyed fabrics produced in this manner had practically no resistance to acid fading.

Example VI

The procedure of Example III was repeated with the sole exception that N,N'-di-(3-chlorophenyl)-ethylene diamine was substituted for the N,N'-di-(2-chlorophenyl)-ethylene diamine. The dyed fabrics produced in this manner had practically no resistance to acid fading.

While our invention has been more particularly described in connection with the treatment of materials having a basis of cellulose acetate, equally satisfactory results are obtained in the treatment of materials which have a basis of other organic derivatives of cellulose. Examples of such other organic derivatives of cellulose are cellulose esters such as cellulose propionate, cellulose butyrate, cellulose acetate-propionate and cellulose acetate-butyrate and cellulose ethers such as ethyl cellulose and benzyl cellulose.

It is to be understood that the foregoing detailed description is given merely by way of illustration and that many variations may be made therein without departing from the spirit of our invention.

Having described our invention, what we desire to secure by Letters Patent is:

Process for preparing colored cellulose acetate textile material having improved resistance to acid fading which comprises dyeing said textile material with an aqueous dyebath containing the blue dyestuff 1-(2-hydroxyethylamino)-4-methylamino anthraquinone, acetone and N,N'-di-(2-chlorophenyl)-ethylene diamine dispersed therein in such amount as to deposit in uniform fashion on the fabric 0.1 to 5% of N,N'-di-(2-chlorophenyl)-ethylene diamine.

References Cited in the file of this patent

UNITED STATES PATENTS

| Number | Name | Date |
|---|---|---|
| 2,083,122 | Olpin | June 8, 1937 |
| 2,416,380 | Collie | Feb. 25, 1947 |
| 2,539,212 | Strobel | Jan. 23, 1951 |